US006282685B1

(12) United States Patent
Petty et al.

(10) Patent No.: US 6,282,685 B1
(45) Date of Patent: *Aug. 28, 2001

(54) METHODS AND APPARATUS FOR SIGNALING USING PARITY STATUS

(75) Inventors: Jack S. Petty, Chapel Hill; David Rand Irvin, Raleigh, both of NC (US)

(73) Assignee: Ericsson Inc., Research Triangele Park, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 32 days.

(21) Appl. No.: 08/974,965

(22) Filed: Nov. 20, 1997

(51) Int. Cl.⁷ ........................... H03M 13/00; G06F 11/00
(52) U.S. Cl. .......................... 714/758; 714/752; 714/802
(58) Field of Search ..................... 714/758, 755, 714/757, 712, 705, 800, 802, 811, 704, 774

(56) References Cited

U.S. PATENT DOCUMENTS

| 4,633,464 | 12/1986 | Anderson | 370/111 |
|---|---|---|---|
| 4,774,712 | * 9/1988 | Lewis | 371/51 |
| 4,949,333 | 8/1990 | Gulick et al. | 370/32 |
| 5,168,356 | * 12/1992 | Acampora et al. | 358/133 |
| 5,258,999 | 11/1993 | Wernimont et al. | 375/7 |
| 5,351,243 | * 9/1994 | Kalkunte et al. | 370/92 |
| 5,425,033 | 6/1995 | Jessop et al. | 371/5.1 |
| 5,453,997 | 9/1995 | Roney, IV | 371/41 |
| 5,453,999 | 9/1995 | Michaelson et al. | 371/51.1 |
| 5,481,544 | * 1/1996 | Baldwin et al. | 370/94.1 |
| 5,528,599 | * 6/1996 | Rodriguez et al. | 371/20.1 |
| 5,559,813 | * 9/1996 | Shimizu | 371/37.4 |
| 5,633,890 | 5/1997 | Ahmed | 375/219 |
| 5,638,518 | * 6/1997 | Malladi | 395/200.21 |
| 5,862,160 | * 1/1999 | Irvin et al. | 371/53 |

FOREIGN PATENT DOCUMENTS

| 2 116 403 A | 9/1983 | (GB) | H04L/5/00 |
|---|---|---|---|
| 2 177 280 A | * 1/1987 | (GB) | H01L/11/20 |

OTHER PUBLICATIONS

International Search Report, PCT/US98/21603. Feb, 22, 1999.

* cited by examiner

Primary Examiner—Albert Decady
Assistant Examiner—Samuel Lin
(74) Attorney, Agent, or Firm—Myers Bigel Sibley & Sajovec

(57) ABSTRACT

A communications system for communicating a serial bit stream and parity is disclosed which enables the use of the parity bit for signaling between the transmitter and receiver by selectively inducing parity errors. The system includes a first parity generator used to generate a first parity bit on the data to be communicated. The first parity and the data are transmitted in a communications medium by a data transmitter to a data receiver. A second parity generator generates a second parity bit using the communicated data. A comparator then compares the first parity bit with the second parity bit and a parser parses the received data in response to the comparison.

32 Claims, 8 Drawing Sheets

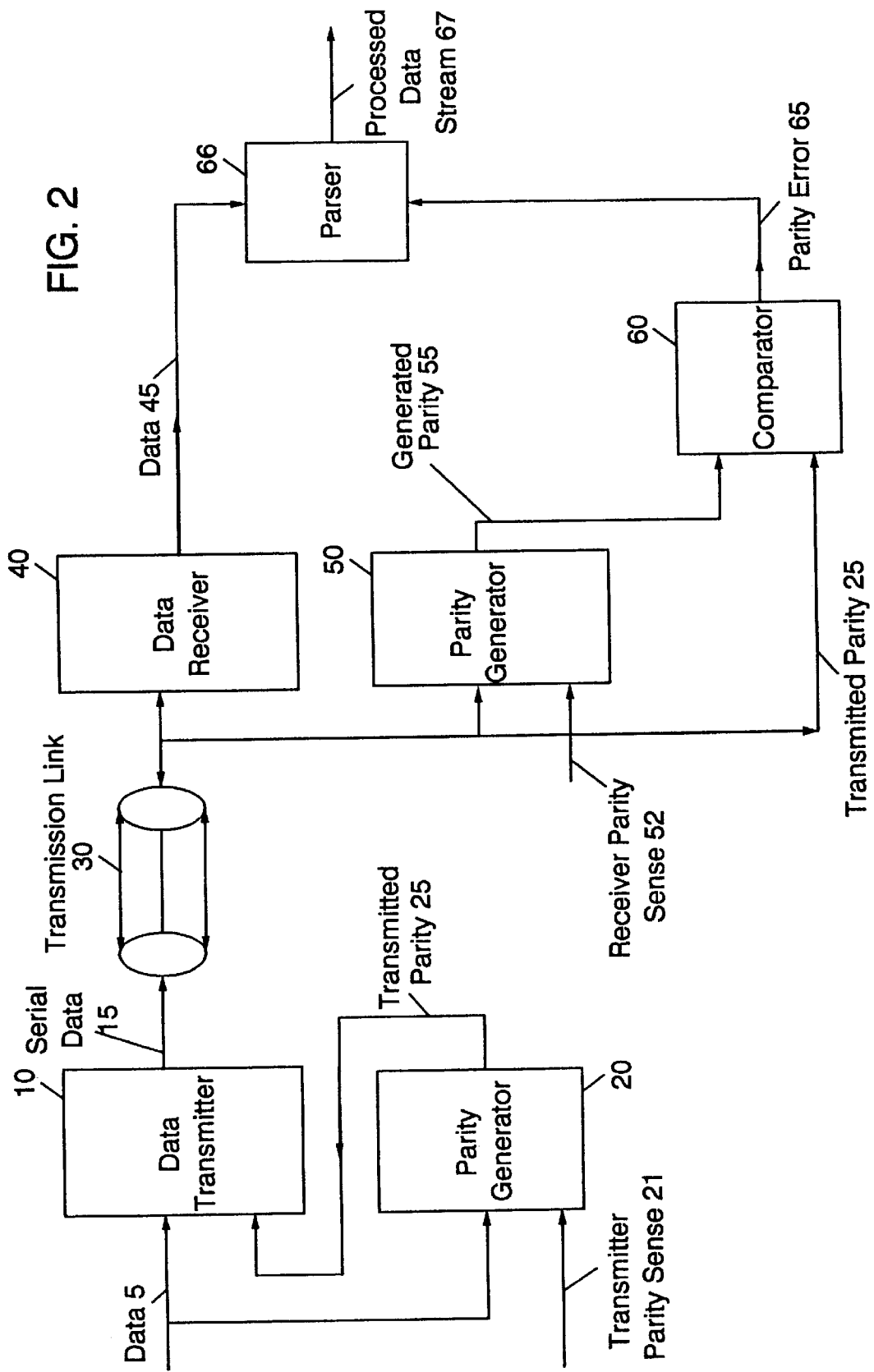

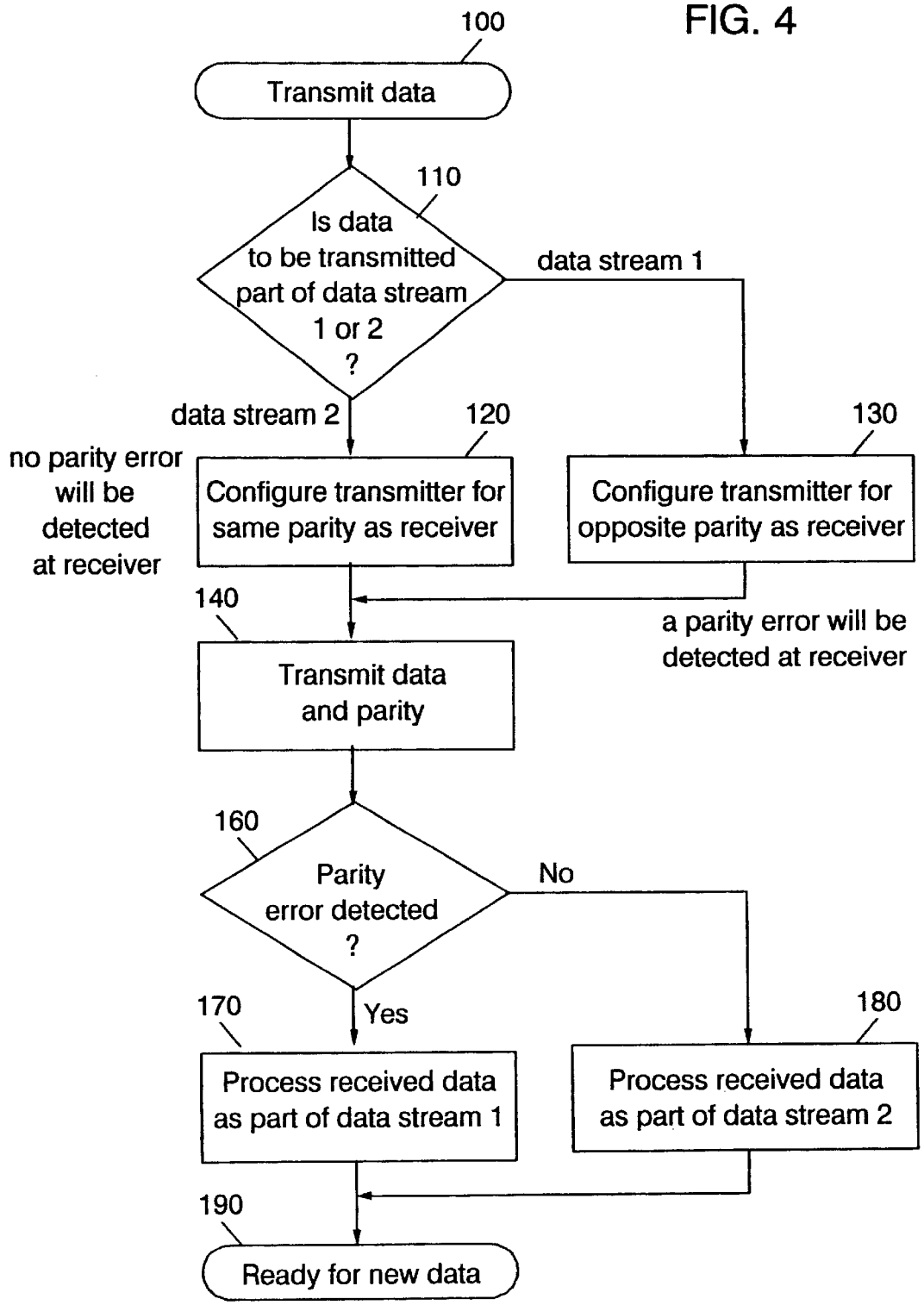

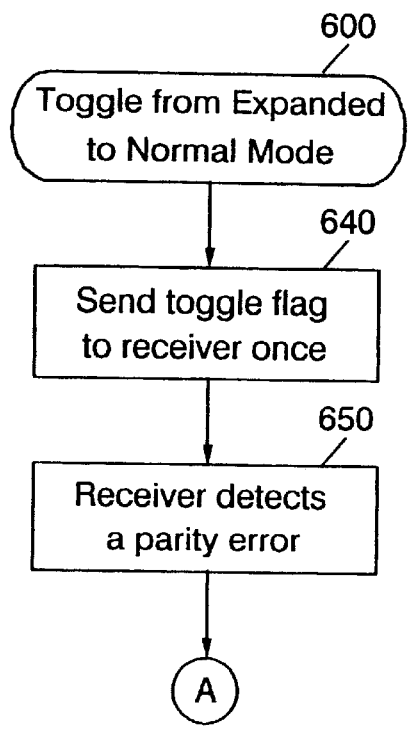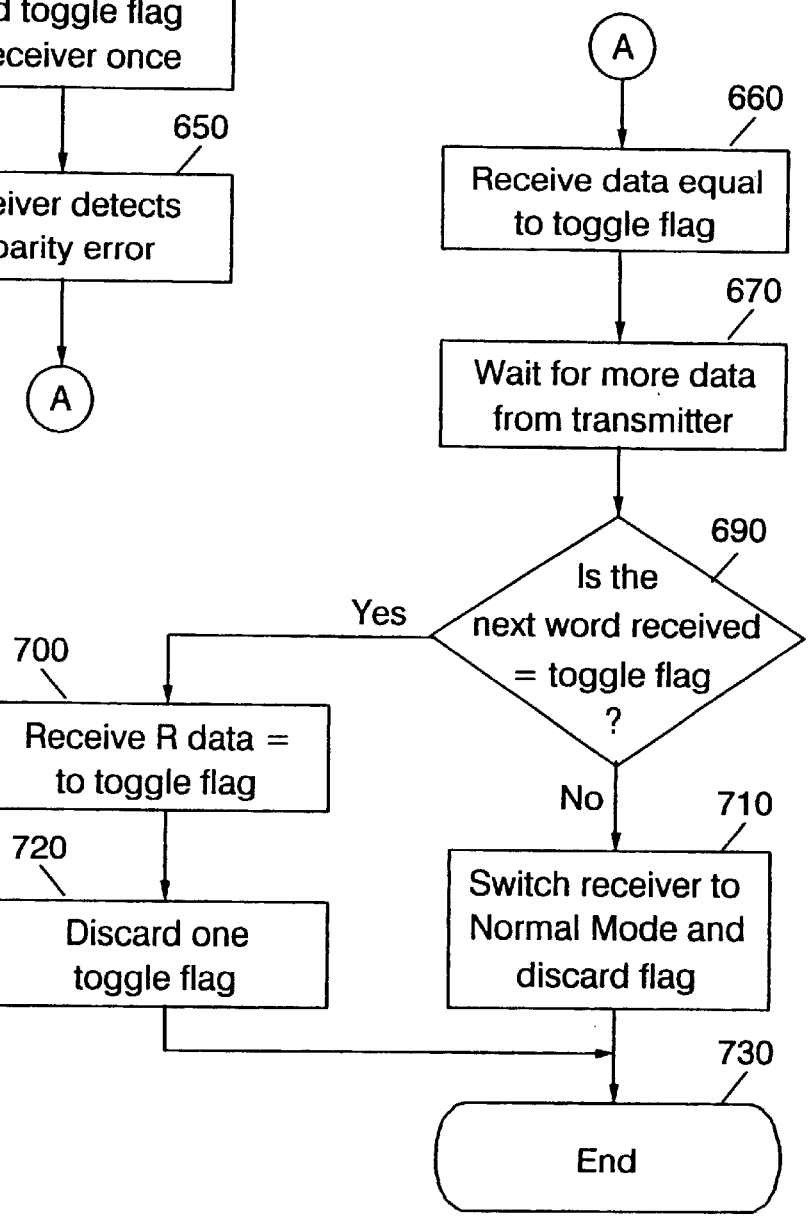

METHODS AND APPARATUS FOR SIGNALING USING PARITY STATUS

FIELD OF THE INVENTION

The present invention relates to communication systems and methods, in particular, to serial communications systems and methods.

BACKGROUND OF THE INVENTION

Typically, serial communication systems use parity to safeguard data integrity during transmission from a transmitter to a receiver. Communications standards are used to ensure compatibility between different systems and to facilitate software development and portability. Hardware has also been developed that incorporates these standards. One such standard specifies that parity may accompany each transmission of serial data. The transmitted parity bit can then be used by the receiver to check data integrity of the serial data. This technique, however, may require additional time or bandwidth for data transmission because a parity bit must be added to the stream of data.

Data integrity, however, has become less of a problem in some situations. Specifically, low noise cables, system enclosures and interconnects reduce the frequency of such errors to a very low level. In other words, in some circumstances errors do not happen as frequently as had been assumed when the standards arose. Moreover, the level of protection afforded by simple parity checking generally has become inadequate for many situations that require error protection. Despite these developments, hardware and software produced today still support the standard referenced above. Parity checking, therefore, is sometimes unnecessary and goes unused in systems that support it. Consequently, the time or bandwidth allocated for transmitting the parity bit is frequently wasted.

A related problem is the need for the exchange of control messages between two asynchronous entities. For example, when a personal computer is communicating with a modem through a EIA232/V.24 cable, sometimes one entity must instruct the other entity to stop or resume sending data. This is commonly referred to as flow control. Flow control may be implemented in two ways: hardware flow control and software flow control. Hardware flow control is typically accomplished by adding wires to the cable. The additional wires carry signals dedicated to flow control. Consequently, hardware flow control may add complexity to the sending and receiving entities and the cable.

Software flow control is usually accomplished by inserting special characters into the data stream at the transmitting entity. The receiving entity is then responsible for recognizing the special character and distinguishing it from normal data that happens to be equal to a special character. Consequently, software flow control may require additional significant software complexity on the part of the receiver.

SUMMARY OF THE INVENTION

It is the object of the present invention to provide communications systems and methods that more efficiently utilize the bandwidth normally associated with parity checking.

It is another object of the present invention to provide communications systems and methods that exchange control messages using standard asynchronous communications hardware without significant added complexity.

Moreover, it is an object of the invention to provide communications systems and methods that use standard hardware to generate the parity bit for purposes other than checking for errors in data transmission.

These and other objects, features and advantages are provided according to the present invention by communications systems and methods which use the parity generation and checking functions typically found in standard asynchronous communications hardware to signal how transmitted data should be processed. Parity errors are forced on data transmissions that contain data that is to be processed in a predetermined way by a receiver if the receiver determines that a parity error exists.

Because some communication links are highly reliable and provide a very low noise environment, parity errors caused by disturbances on such links are very unlikely. Consequently, protection offered by parity often times goes unused. The present invention uses the parity bit as a signal making better use of the otherwise wasted bandwidth allocated to the parity bit in a standard serial communication system. Moreover, the meaning of the signal can be defined by the communication system employing the invention. For example, a communication system may define the parity bit as a signal to the receiver that the associated data is part of a secondary data channel or a distinct data stream. The present invention can also be practiced using commonly available components such as UARTs.

In particular, according to the present invention, a bit stream and an associated parity bit are generated. The bit stream and an associated parity bit are communicated to a receiving entity. The receiving entity performs a parity error analysis on the communicated bit stream and associated parity bit. The receiving entity then parses the communicated bit stream according to the parity error analysis.

According to another aspect of the invention, a first parity generator is used to generate a first parity bit on the data to be communicated. The first parity and the data are transmitted in a communications medium by a data transmitter to a data receiver. A second parity generator generates a second parity bit using the communicated data. A comparator then compares the first parity bit with the second parity bit. A parser then processes the communicated data according to the results of the comparison of the first and second parity bits.

A communications system for communicating a serial bit stream and parity according to an embodiment of the resent invention includes means for generating a serial it stream and generating associated parity. Means are rovided, responsive to the parity generation means, for anipulating the generated parity. Means are provided, responsive to the manipulating means and the serial data means, for communicating the serial bit stream to the receiving entity. Means are provided, responsive to the means for communicating, for analyzing the serial bit stream and the manipulated parity for the presence of a parity error. Means are provided, responsive to the analyzing means, for parsing the communicated bit stream according to a parsing process selected based on the parity analysis. Improved data communications are thereby provided.

BRIEF DESCRIPTION OF THE DRAWINGS

Some of the objects and advantages of the present invention having been stated, others will be more fully understood from the detailed description that follows and by reference to the accompanying drawings in which:

FIG. 2 illustrates a high level block diagram showing the components in the present invention;

FIG. 4 illustrates a flowchart of an embodiment of the present invention transmitting two logical data streams using one physical transmission link;

FIGS. 7A and 7B illustrate a flowchart of a preferred embodiment of the present invention switching from expanded to normal mode.

DETAILED DESCRIPTION OF PREFERRED EMODIMENTS

The present invention will now be described more fully hereinafter with reference to the accompanying drawings, in which a preferred embodiment of the invention is shown. This invention may, however, be embodied in many different forms and should not be construed as limited to the embodiments set forth herein; rather these embodiments are provided so that this disclosure will be thorough and complete, and will fully convey the scope of the invention to those skilled in the art. Like numbers refer to like elements throughout.

In general, parity ensures that the number of data bits in the logical one state transmitted across a serial transmission link is always an odd or even number, depending on how the parity generation is configured. Transmission is accomplished by merging the data to be transmitted and the proper parity into a serial bit stream and transmitting each bit for a period of time until all bits, including the parity, have been transmitted. The serial bit stream and parity are then transmitted by a transmitting entity to a receiving entity. A transmitting entity refers to the portion of the system responsible for transmitting the data. Similarly, a receiving entity refers to the portion of the system responsible for receiving the transmitted serial bit stream and parity. Those skilled in the art will appreciate that transmitting and receiving entities can be implemented in combinations of hardware and software.

Figure 1:
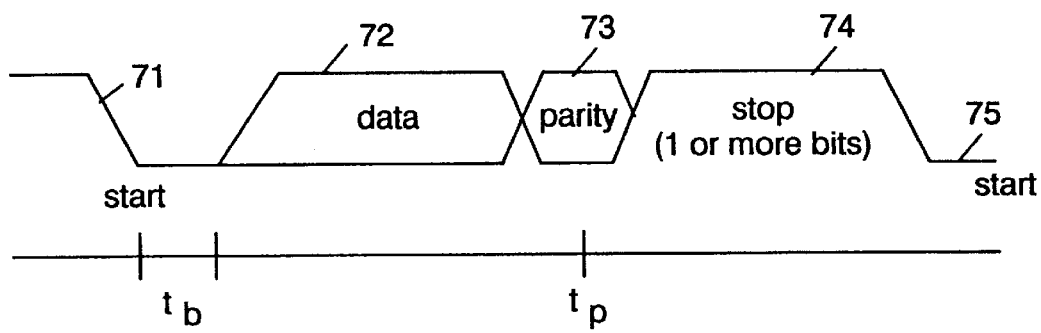
FIG. 1 illustrates a timing diagram for a serial communication system.

Such a transmission is illustrated in FIG. 1. Serial transmission begins with a low going pulse 71 asserted for a time $t_b$, representing the time used to transmit a single bit. The low going pulse 71 is used to signal the receiving entity that a stream of data will follow. Following the generation of the low going pulse 71, the transmitting entity transmits the stream of single bits represented by Data 72. The transmitter then transmits parity. Each data bit and the parity bit transmitted is allocated a time slot $t_b$. Finally, the transmitter transmits a number of high going stop bits 74 to signal the receiver that transmission is complete. The transmitter is then free to initiate a new transfer by transmitting a new low going pulse 75.

A system for performing information transfers according to embodiments of the present invention is shown in FIG. 2. Although the invention is described in terms of an eight bit serial link, the invention may also be utilized for other types of data links (e.g., a parallel data link) and different size data words (e.g., a seven bit data word). The The Data 5 is loaded into a Data Transmitter 10 and into a Parity Generator 20. Parity Generator 20 generates Transmitted Parity 25 in accordance with Transmitter Parity Sense 21. If Transmitter Parity Sense 21 indicates odd parity, parity Generator 20 generates odd parity. Otherwise, Parity Generator 20 generates even parity. Furthermore, if a Parity Error 65 is induced, Transmitter Parity Sense 21 will indicate the opposite parity as indicated by Receiver Parity Sense 52. Once Transmitted Parity 25 is generated, Data Transmitter 10 merges Data 5 and Transmitted Parity 25 into a single serial bit stream Serial Data 15. Serial Data 15 is then transmitted across a Transmission Link 30 according to the timing relationship described in FIG. 1.

The portion of Serial Data 15 that represents Data 5 is loaded into a Data Receiver 40 and a Parity Generator 50. The portion of Serial Data 15 that represents Transmitted Parity 25 is loaded into a Comparator 60. Parity Generator 50 generates Generated Parity 55 on that portion of Serial Data 15 that represents Data 5. Comparator 60 then compares Generated Parity 55 with that portion of Serial Data 15 that represents Transmitted Parity 25 and generates a Parity Error 65. If Generated Parity 55 and Transmitted Parity 25 are the same, Parity Error 65 indicates no parity error. Otherwise Parity Error 65 indicates the presence of a parity error. Parity Error 65 indicates how Data 45 is to be parsed. A Parser 66 processes the Data 45 according to the Parity Error 65. If the Parity Error 65 indicates a parity error, Parser 66 processes the Data 45 according to a predetermined method, producing a processed data stream 67. If the Parity Error 65 indicates the absence of a parity error, the Parser 66 processes the Data 45 according to an alternative method.

FIGS. 3–7A and 7B are flowchart illustrations of methods and apparatus for signaling with forced parity errors using commonly used hardware and communication interfaces. Those skilled in the art will understand that each block of the flowchart illustrations, and combinations of blocks in the flowchart illustrations, may be implemented with various commonly used communication system components. It will also be understood that portions of the operations described in the flowchart illustrations may be executed as computer program instructions loaded into a computer or other data processing apparatus, thus producing a machine which Hiprovides means for implementing the functions specified in the flowchart blocks and combinations thereof. The computer program may cause operational steps to be performed on the computer or data processing apparatus to produce a computer-implemented process such that the instructions which execute on the computer or data processing apparatus provide steps for implementing the functions of the flowchart blocks or combinations thereof. Accordingly, blocks of the flowchart illustrations support combinations of means for performing the specified functions.

In general, the means depicted in FIGS. 3–7A and 7B may be implemented with special purpose hardware or software or firmware running on a data processing apparatus or combinations thereof. For example, the means depicted in FIGS. 3–7A and 7B may be implemented with industry standard Universal Asynchronous Receiver Transmitter (UART) devices. Specifically, UARTs such as ones manufactured by Western Digital and others with the identification numbers 8250, 16450, and 16550 are widely available.

Figure 3:
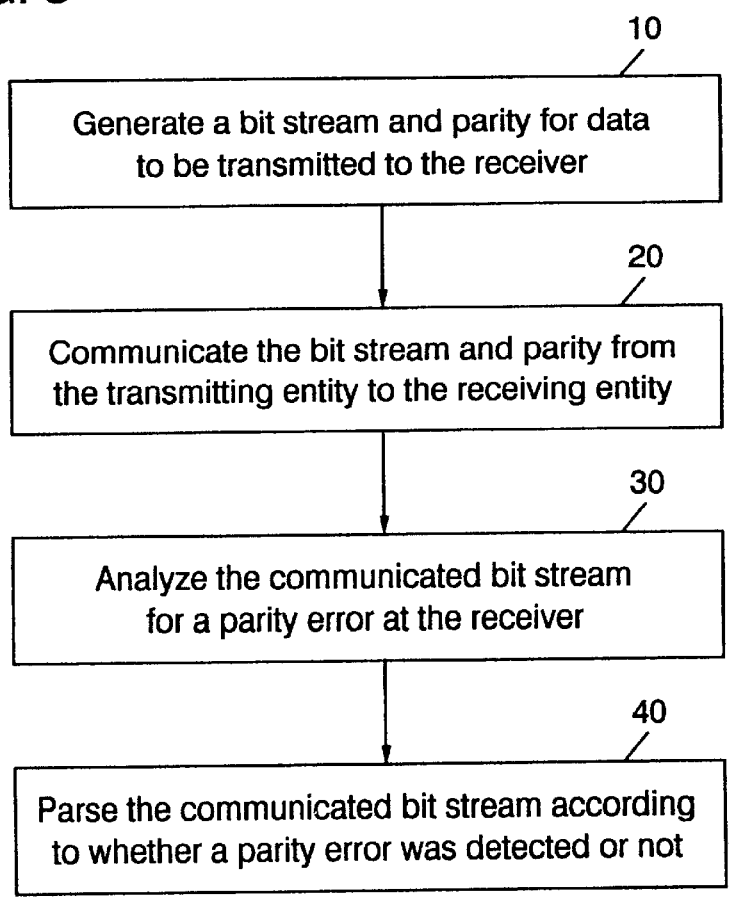
FIG. 3 illustrates a flowchart of the operation of the present invention.

FIG. 3 conceptually illustrates operations for transferring information according to method aspects of the present invention. The process begins with the generation of a serial bit stream including parity (Block 10). The serial bit stream is created by separating the data bits that comprise a larger unit of data and processing each data bit individually. For example, data stored in a byte format is comprised of eight individual bits. The byte, therefore, would create a bit stream of eight bits. The parity is generated by calculating how many individual bits of the bit stream are logical ones and generating a parity bit in accordance with the parity sense being used. The invention uses the parity generation to signal how the associated bit stream should be parsed. The signal comes in the form of a parity error selectively induced at transmission by manipulating the parity generated for the bit stream. For example, if the bit stream data is such that it should be parsed in a particular way, the parity bit is intentionally configured to be incorrect for the associated bit stream. Consequently, a parity error will be detected at the receiving entity and the bit stream will be parsed accordingly. On the other hand, if the bit stream data is such that it should be parsed in yet a different manner, no parity error may be induced. Consequently, no parity error will be detected and the bit stream will be parsed differently.

The generated bit stream and parity are then communicated to the receiving entity (Block 20). The communicated bit stream and parity are used to determine whether an error has occurred during communication (Block 30). The communicated bit stream is parsed according to a predetermined process if a parity error is detected (Block 40). If no parity error is detected, a different parsing process is used.

FIG. 4, in conjunction with FIG. 2, illustrates the operation of the present invention in a particular embodiment used for transmitting two separate data streams over a transmission link (Block 100). Use of this embodiment makes it possible to maintain two logical data streams using one physical Transmission Link 30 (Block 110). For example, a first data stream carrying control information could be identified by forcing a parity eror to occur on each transmission associated with that particular data stream. This can be done by using Transmitter Parity Sense 21 to configure the Parity Generator 20 for the opposite parity as the Parity Generator 50 (Block 130). Similarly, a second data stream carrying digitally encoded text could be identified by associating the occurrence of no parity error with all data associated with that data stream. This can be done by configuring the Parity Generator 20 to use the same parity as the Parity Generator 50 (Block 120). In this way, the parity associated with each data transmission is used as a signal as to how the data should be parsed.

Once the parity is configured, the data and parity are transmitted as Serial Data 15 to the receiving entity (Block 140). Serial Data 15 is loaded into the Parity Generator 50 which then generates the Generated Parity 55. The Comparator 60 determines whether a parity error exists by comparing the Transmitted Parity 25 to the Generated Parity 55 (Block 160). If a parity error is detected, the received data is parsed as part of the first data stream by the Parser 66 (Block 170). If no parity error is detected the data is parsed by the Parser 66 as part of the second data stream. The receiving entity is then ready for a new data transmission (Block 190).

FIGS. 5A, 5B, 5C, 6A, 6B, 7A and 7B, in conjunction with FIG. 2, illustrate operations for transmitting additional data as part of a bit stream transmitted across a transmission link according to a method aspect of the present invention. This aspect uses parity status to signal the transmission of data that has not been explicitly transmitted as part of the serial bit stream. In other words, the parity analysis is used as a signal to the receiving entity to alter or to add data to the bit stream received. For example, referring now to FIG. 1, if the transmitting entity transmits eight bits of data as Data 72, a ninth bit can be added to the transmission by selectively inducing a parity error which, by prior agreement, serves as a signal to the receiver. This can be done by generating Parity 73 to cause a mismatch with the parity generated by the receiver. The resulting parity error is interpreted by the receiver as a signal to add a ninth bit, a logical one for example, to Data 72. Similarly, a transmission that results in no parity error can also be used, as a signal to add a logical zero as the ninth bit.

Figure 5A:
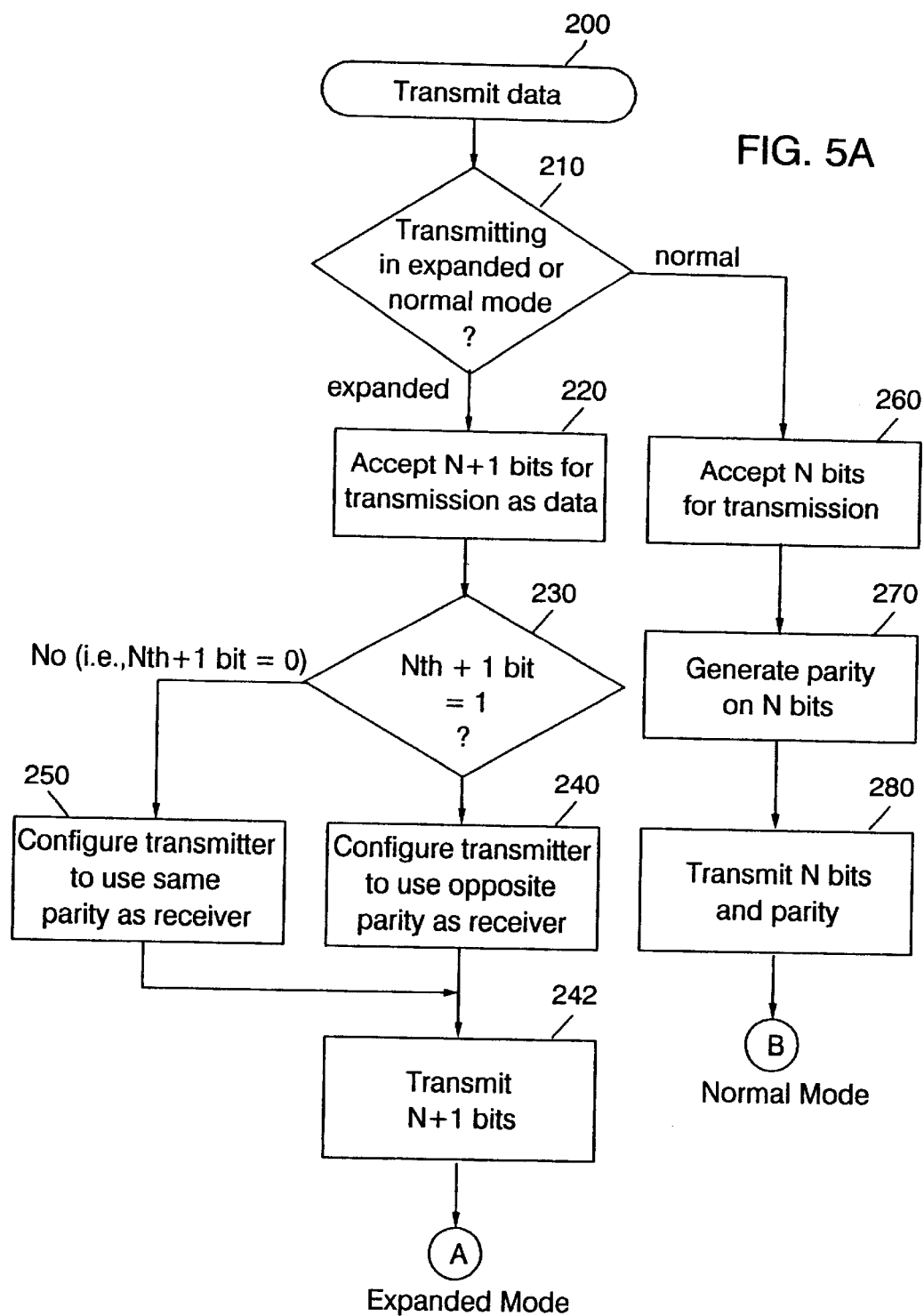
FIGS. 5A and 5B, and 5C illustrate a flowchart of an embodiment of the present invention transmitting N+1 bits using an N bit physical transmission link.
Figure 5B:
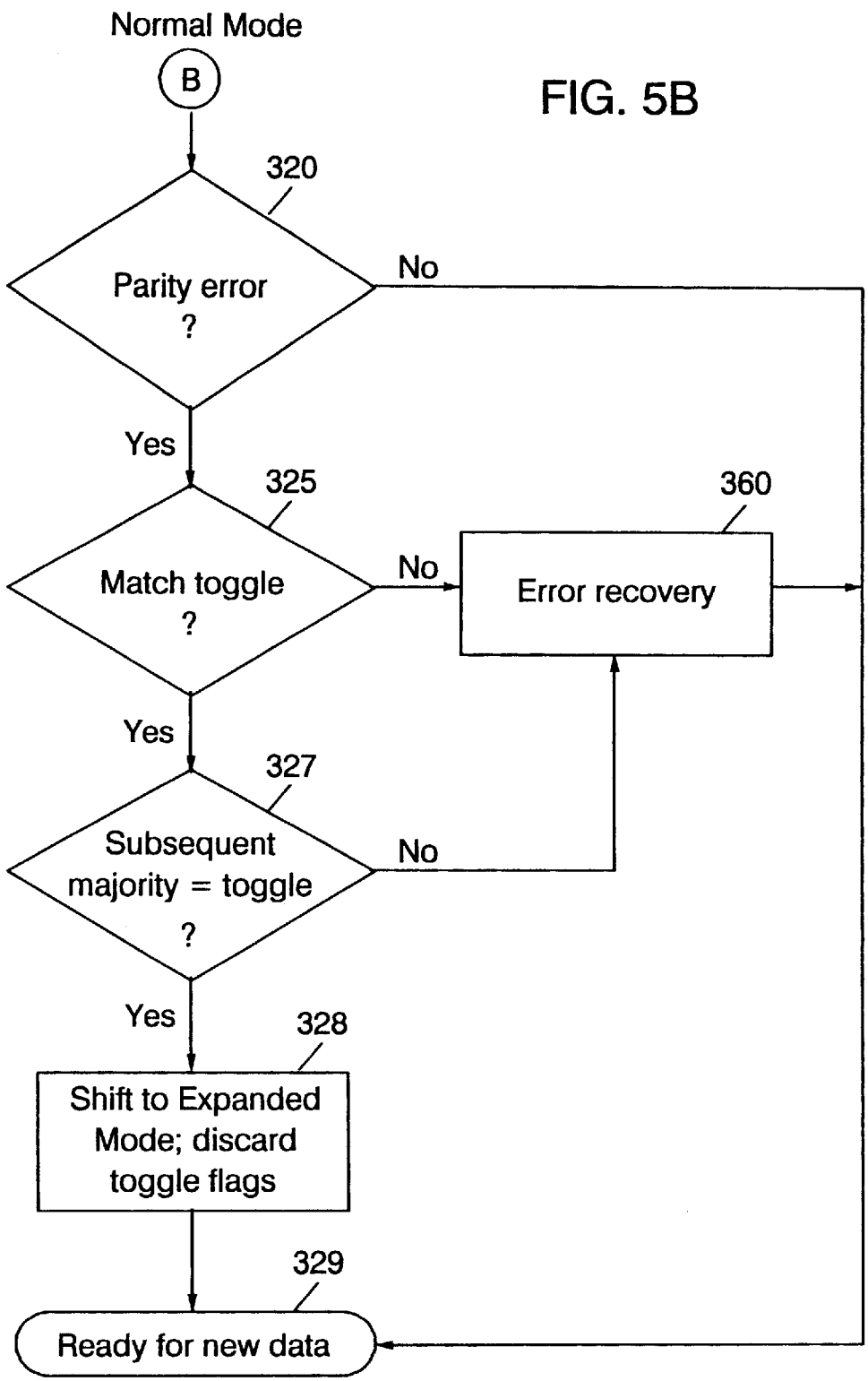
Figure 5C:
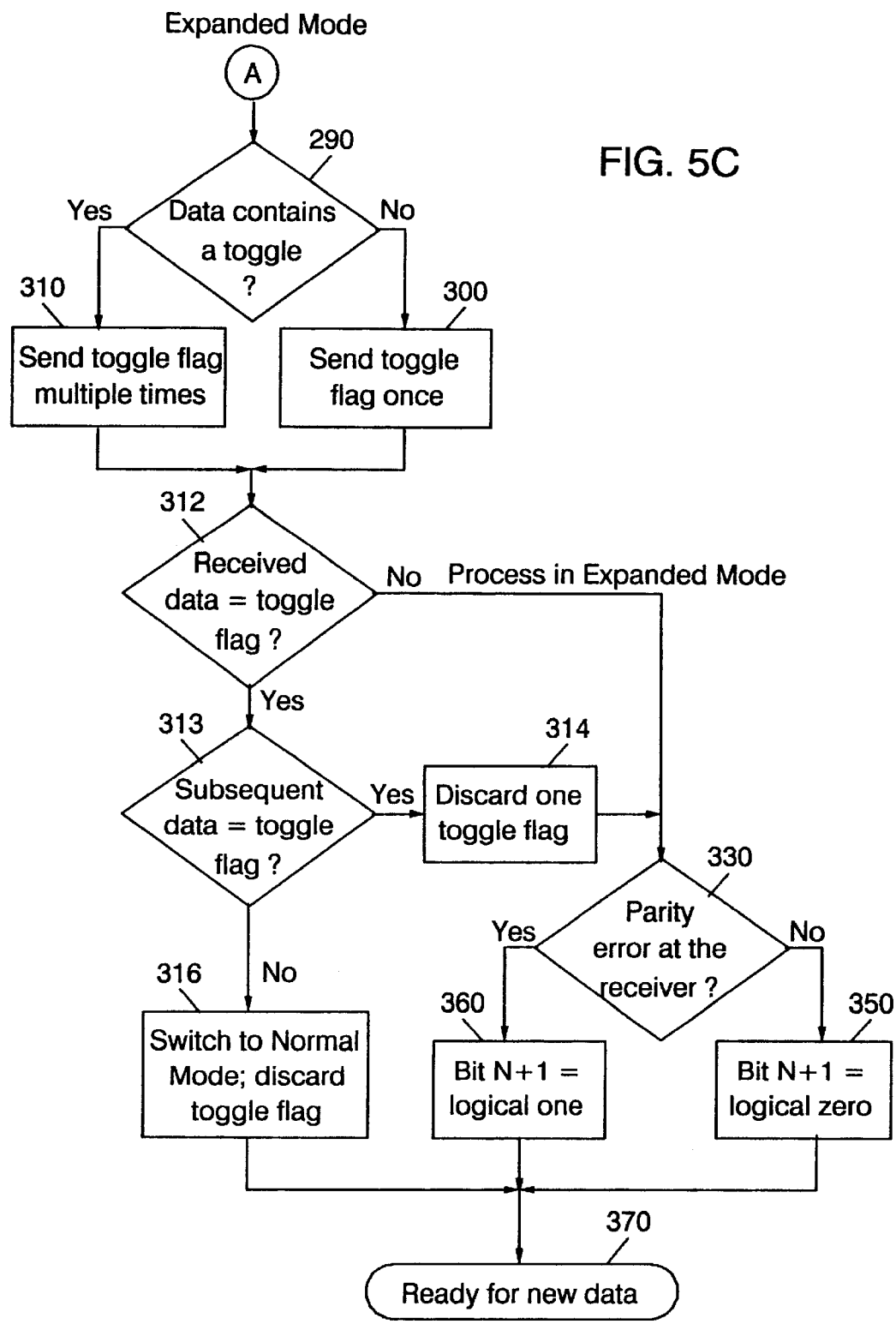

FIGS. 5A, 5B, and 5C, in conjunction with FIG. 1 and FIG. 2, illustrate operations according to a second method aspect for transmitting additional data as part of a bit stream transmitted across the Transmission Link 30. In the present embodiment, the invention operates in two modes. In a normal mode N bits are transmitted as Data 72 along with Parity 73. In this mode, the parity is used to protect data integrity. In an expanded mode, N+1 bits are transmitted where N bits are transmitted as Data 72 and Parity 73 is used to signal the value of the N+1 bit.

Furthermore, the present embodiment switches or toggles between normal and expanded modes. The present embodiment uses a predetermined toggle flag to signal the receiver to switch modes. To switch modes, the toggle flag is transmitted by the transmitting entity to the receiving entity. The receiving entity examines all received data to determine whether the data being received is a signal to switch modes or data of the expanded data stream.

Referring now to FIG. 5A, the transmitting entity transmits data depending upon which mode is presently active (Block 210). If expanded mode is active, N+1 bits are processed for transmission and the parity bit is manipuluated to signal the value of the Nth+1 (Block 220). If normal mode is active, N bits are processed for transmission and the parity bit is used as protection for the bit stream (Block 260). Each mode of operation will now be described in detail.

In the normal mode, N bits are loaded into the Data Transmitter 10 (Block 260) and the Parity Generator 20 (Block 270). The Parity Generator 20 generates Transmitted Parity 25 using Transmitter Parity Sense 21. The N bits and Transmitted Parity 25 are then transmitted across the Transmission Link 30 (Block 280). Referring now to FIG. 5B, the receiver checks the received data for parity error (Block 320). Parity Generator 50 generates Generated Parity 55, which Comparator 60 compares with Transmitted Parity 25. If Transmitted Parity 25 matches Generated Parity 55, neither a parity error nor a toggle flag is detected, and the receiver is ready for new data (Block 329).

Otherwise (i.e., if Transmitted Parity 25 does not match Generated Parity 55), the receiver checks to see if the received data matches the toggle flag, which in the preferred embodiment is deliberately chosen to have a parity violation (for example, bit pattern 011011010 in a normal mode system operating with even parity). If the received data does not match the toggle flag (Block 325), or if a majority of the M blocks following the first instance of the toggle flag do not match the toggle flag (Block 327), then an error is presumed to have occurred, and appropriate error-recovery procedures outside the scope of the present invention are initiated (Block 360). Otherwise, if the received data matches the toggle flag, and a majority of the next M blocks of the received data also match the toggle flag, the first instance of the toggle flag and the subsequent M blocks are discarded, operation shifts to expanded mode (Block 328), and the receiver is ready for new data (Block 329).

Now referring back to Block 220 in FIG. 5A, in expanded mode, N+1 bits are accepted for transmission and the parity bit is used to signal the receiver as to the value of the Nth+1 bit. The Nth+1 bit is examined (Block 230). If the Nth+1 bit is a logical zero, the Transmitter Parity Sense 21 is used to configure the Parity Generator 20 to use the same parity as the Parity Generator 50 (Block 250). If the Nth+1 bit is a logical one, the Transmitter Parity Sense 21 is used to configure the Parity Generator 20 to use the opposite parity as the Parity Generator 50 (Block 240). The N bits and the Transmitted Parity 25 are then transmitted across the Transmission Link 30 to the receiving entity (Block 242).

Referring now to FIG. 5C, if the N+1 bits happen to equal the predetermined toggle flag, the transmitting entity must transmit otherwise redundant information, enabling the receiving entity to avoid interpreting the data as a toggle flag (Block 290). The transmitting entity avoids this misinterpretation by adding one additional data transmission of the toggle flag when the data happens to include one or more instance of the toggle flag (Block 310). For example, when the toggle flag appears once in the text, the transmitter sends it twice; when the toggle flag appears R consecutive times in the text, the transmitter sends it R+1 times. This repetition allows the receiving entity to assume that all data that equals the toggle flag will occur more than once in the data stream. Conversely, if the transmitting entity wishes to switch modes, the toggle flag is transmitted once (Block 300).

If the receiver determines that the data is not equal to the toggle flag (Block 312), the data is processed in expanded mode, following which the receiver is ready for new data (Block 370). Otherwise (i.e., the received data is equal to the toggle flag), the receiver waits for additional data before taking action. If the next data is not another toggle flag (Block 313), operation switches from expanded mode to normal mode, the data is processed in normal mode, the earlier-received toggle flag is discarded (Block 316), and the receiver is ready for new data (Block 370). On the other hand, if R subsequent data blocks are equal to the toggle flag (Block 313), then the earlier-received instance of the toggle flag is discarded (Block 314), and the R data blocks, which are themselves toggle flags only by chance, are processed in expanded mode.

In expanded-mode processing, the parity of the data is examined (Block 330). If a parity error is not evident, the N+1 bit is set to logical zero (Block 350); if a parity error is evident, the N+1 bit is set to logical one (Block 360).

As described above, data transmission may toggle between normal and expanded modes. The transmitting and receiving entity make a prior agreement that a particular flag will serve as the toggle flag. In the preferred embodiment, the toggle flag is constructed so as to induce a parity error in the receiver; more particularly the data word 011011010 is used. When the toggle flag is received, the receiving entity switches from its present mode of operation to the other mode as explained below. For example, if the receiver is in normal mode and receives a toggle flag, the receiver switches to expanded mode. Similarly, if the receiver receives the toggle flag while in expanded mode, the receiver will switch to normal mode.

Figure 6A:
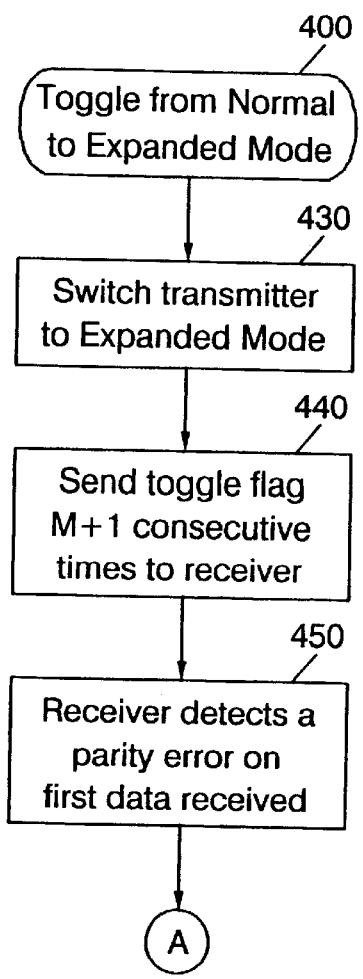
FIGS. 6A and 6B illustrate a flowchart of a preferred embodiment of the present invention switching from normal to expanded mode.
Figure 6B:
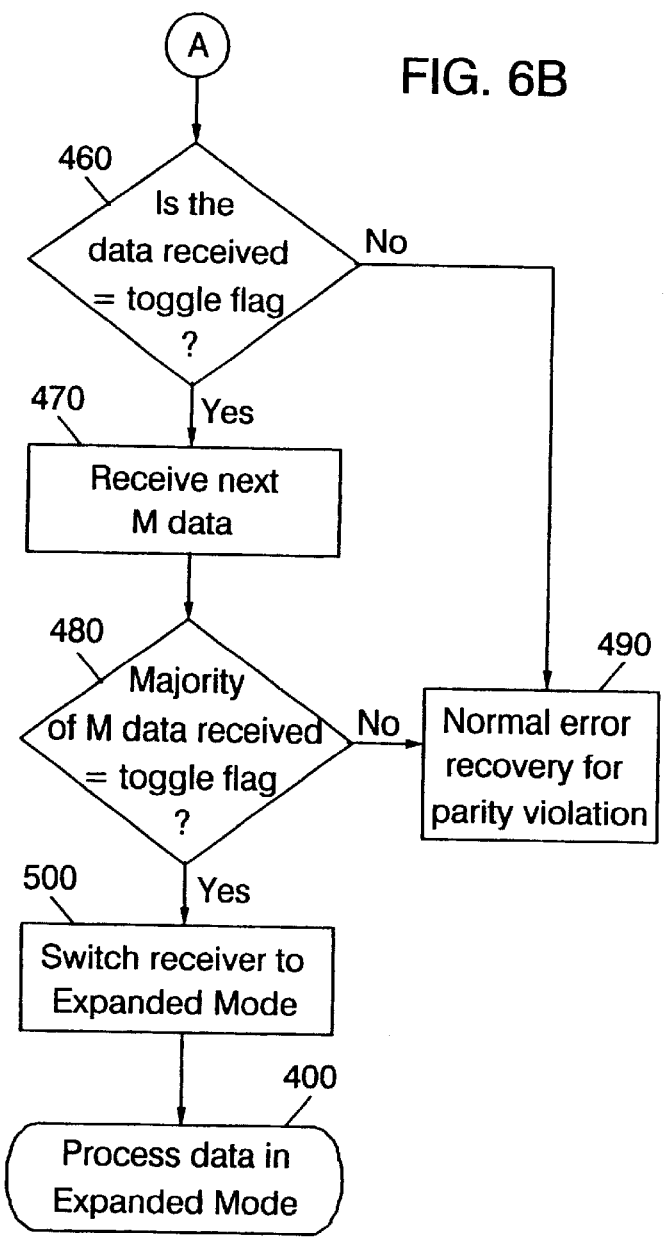

FIGS. 6A and 6B, in conjunction with FIG. 2, further illustrate operations for switching from normal to expanded mode according to the toggling aspect (Block 400). Referring now to FIG. 6A, the switch from normal to expanded mode begins when the transmitting entity configures the Parity Generator 20 for the opposite parity as the Parity Generator 50 (Block 430). The transmitting entity sends the toggle flag to the Data Transmitter 10 M+1 consecutive times (Block 440). The Receiver then detects the parity errors associated with the toggle flag (Block 450).

Referring now to FIG. 6B, the receiving entity determines whether the data received is equal to the toggle flag (Block 460). If the received data is not equal to the toggle flag, the data is treated as part of the data stream that experienced a parity error (Block 490). If the receiving entity so provides, it may perform some level of error recovery in this case (Block 490). If the received data is equal to the toggle flag, the receiving entity accepts the next M data transmissions (Block 470) and determines whether a majority of the M data transmissions received are equal to the toggle flag (Block 480). If a majority of the M data transmission are not equal to the toggle flag (Block 480), the receiving entity concludes that the data transmissions are part of a data stream that experienced a parity error (Block 490). If a majority of the M data transmissions are equal to the toggle flag, the receiving entity concludes that the data transmissions are a toggle flag and the receiving entity switches to expanded mode (Block 500). The receiving entity then begins parsing received data streams in expanded mode (Block 510).

FIGS. 7A and 7B, in conjunction with FIG. 2, illustrate operations for switching from expanded to normal mode according to the toggling aspect (Block 600). Referring now to FIG. 7A, switching from expanded to normal mode begins with the transmission of one toggle flag (Block 640). In the preferred embodiment, the toggle flag, as described above, should be selected to cause a parity error at the receiving entity. The error may be induced by mismatching the Transmitter Parity Sense 21 and the Receiver Parity Sense 52. Mismatching the parity will ensure that a parity error will be detected, enabling the receiving entity to easily identify the switch to normal mode. The parity mismatch, however, is not a requirement to practice the invention. The toggle flag is sent once to enable the receiving entity to distinguish the toggle flag from data.

Referring now to FIG. 7B, the receiving entity detects a parity error (Block 650) and determines that the data received is equal to the toggle flag (Block 660). The receiving entity waits to receive the second data transmission (Block 670). When the second data arrives, the receiving entity determines whether the data also equals the toggle flag (Block 690). As described above, the transmitting entity transmits toggle flags only once, while an additional instance of the toggle flag is sent when a run of data happens to equal the toggle flag. The different treatment of toggle flags and data enables the receiving entity to distinguish between a toggle flag and data that happens to equal the flag. If the second data equals the toggle flag, the data is part of a data stream. This means that the receiving entity will receive a total of R+1 toggle flag transmissions where R is equal to the number of times the toggle flag occurs in the data stream (Block 700). For example, if the data stream contains five consecutive occurrences of data equal to the toggle flag, the transmitting entity will transmit the toggle flag six times. In this example, R is equal to five After receiving the initial data, the receiving entity will receive five, or R, additional occurrences. Consequently, the receiver will disregard one of the occurrences R+1 (Block 720) which competes the transmission (Block 730). If the second data received is not equal to the toggle flag, however, the toggle flag was intentional and the receiver switches to normal mode (Block 710). The receiver then disregards the toggle flag which completes the switch from expanded to normal mode.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A method of communicating information between a transmitting entity and a receiving entity, each of which are operative to communicate a bit stream that includes a parity bit for detecting errors in the bit stream, the method comprising the steps of:

generating a bit stream from the information, the bit stream including a parity bit;

communicating the generated bit stream from the transmitting entity to the receiving entity;

performing a parity error analysis on said communicated bit stream; and parsing the communicated bit stream according to a parsing process selected based on said parity error analysis to provide an uncorrected communicated bit stream, wherein said step of parsing comprises the steps of:

parsing said communicated bit stream using a first first parsing process slected from a plurality of predetermined parsing processes based on said parity error analysis performed on said communicated bit stream; and detecting a toggle flag within said communicated bit stream, wherein said step of detecting comprises the steps of:

determining whether said toggle flag is followed by an additional toggle flag; and switching said receiving entity to an expanded mode if said toggle flag is not followed by said additional toggle flag; and parsing a subsequent communicated bit stream using a second parsing process selected from said plurality of predetermined parsing processes based on said parity error analysis performed on said subsequent communicated bit stream.

2. A method according to claim 1, wherein said step of switching comprises the step of changing said parsing process in response to detecting said additional toggle flag so as to identify more than one logical channel.

3. A system for communicating information between a transmitting entity and a receiving entity, each of which are operative to communicate a bit stream that includes a parity bit for detecting errors in the bit stream, the system comprising:

means for generating a bit stream from the information, the bit stream including a parity bit;

means for communicating the generated bit stream from the transmitting entity to the receiving entity;

means for performing a parity error analysis on said communicated bit stream; and means for parsing the communicated bit stream according to a parsing process selected based on said parity enor analysis to provide an uncorrected communicated bit stream, wherein said means for parsing comprises:

means for parsing said communicated bit stream using a first parsing process selected from a plurality of predetermined parsing processes based on said parity error analysis performed on said communicated bit stream; and means for detecting a toggle flag within said communicated bit stream, wherein said means for detecting comprises:

means for determning whether said toggle flag is followed by an additional toggle flag; and means for switching said receiving entity to an expanded mode if said toggle flag is not followed by said additional toggle flag; and means for parsing a subsequent communicated bit stream using a second parsing process selected from said plurality of predetermined parsing processes based on said parity error analysis performed on said subsequent communicated bit stream.

4. A system according to claim 3, wherein said means for switching comprises means for changing said parsing process in response to detecting said additional toggle flag so as to identify more han one logical chanmel.

5. A method of conununicating information between a transmitting entity and a receiving entity, each of which are operative to communicate a bit stream that includes a parity bit for detecting errors in the bit stream, the method comprising the steps of:

generating a bit stream from the information, the bit stream including a parity bit;

communicating the generated bit stream from the transmitting entity to the receiving entity;

performing a paity error analysis on said communicated bit stream; and parsing said communicated bit stream using a first paring process selected from a plurality of predetermined parsing processes based on said parity error analysis performed on said communicated bit stream;

detecting a toggle flag within said communicated bit stream;

parsing a subsequent communicated bit stream using a second parsing process selected from said plurality of predetermined parsing processes based on said parity error analysis performed on said subsequent communicated bit stream;

determining whether said toggle flag is followed by an additional toggle flag;

switching said receiving entity to an expanded mode if said toggle flag is not followed by said additional toggle flag.

6. A method according to claim 5, wherein said step of switching comprises the step of changing said parsing process in response to detecting said additional toggle flag so as to identify more than one logical channel.

7. A method of communicating information from a transmitting entity to a receiving entity, the method comprising the steps of:

manipulating a parity bit associated with the information to be transmitted based on a determination whether the information is associated with at least one of a first logical data stream and a second logical data stream;

transmitting the information and the manipulated parity bit from the transmitting entity to the receiving entity; and associating the information with at least one of the first logical data stream and the second logical data stream based on a parity error analysis of the transmitted information and the parity bit.

8. A method according to claim 7, further comprising the steps of:

determining whether the information to be transmitted from the transmitting entity to the receiving entity is associated with at least one of the first logical data stream and the second logical data stream;

generating the parity bit associated with the information;

manipulating the parity bit based on the determination whether the information to be transmitted is associated with at least one of the first logical data stream and the second logical data stream;

transmitting the information and the parity bit from the transmitting entity to the receiving entity;

performing a parity error analysis on the infonnation and the parity bit; and associating the received information with at least one of the first logical data stream and the second logical data stream based on the parity error analysis.

9. A method according to claim 7, wherein the step of manipulating comprises the steps of:

generating incorrect parity for the information upon determining that the information is associated with the first logical data stream; and generating correct parity for the information upon determining that the information is associated with the second logical data stream.

10. A method according to claim 7, wherein the manipulated parity bit is not included in one of the first and second logical data streams.

11. A method according to claim 7, wherein the step of associating further comprises associating the information with the first logical data stream upon detecting a parity error at the receiving entity and associating the information with the second logical data stream upon detecting no parity error at the receiving entity.

12. A method for transmitting information from a transmitting entity to a receiving entity, the method comprising the steps of:

manipulating a parity bit associated with the information to be transmitted based on a determination whether the information is associated with at least one of a first logical data stream and a second logical data stream; and transmitting the information and the manipulated parity bit from the transmitting entity to the receiving entity.

13. A method for receiving information from a transmitting entity at a receiving entity, the method comprising the steps of:

performing a parity error analysis on received information and a manipulated parity bit; and associating the information with at least one of a first logical data stream and a second logical data stream based on the parity error analysis of the received information and the manipulated parity bit.

14. A system for communicating information from a transmitting entity to a receiving entity, the system comprising:

means for manipulating a parity bit associated with the information to be transmitted based on a determination whether the information is associated with at least one of a first logical data stream and a second logical data stream;

means for transmitting the information and the manipulated parity bit from the transmitting entity to the receiving entity; and means for associating the information with at least one of the first logical data stream and the second logical data stream based on a parity error analysis of the transmitted information and the parity bit.

15. A system according to claim 14 fuirther comprising:

means for determining whether the information to be transmitted from the transmitting entity to the receiving entity is associated with at least one of the first logical data stream and the second logical data stream;

means for generating the parity bit associated with the information;

means for manipulating the parity bit based on the determination whether the information to be transmitted is associated with at least one of the first logical data stream and the second logical data stream;

means for transmitting the information and the parity bit from the transmitting entity to the receiving entity;

means for performing a parity error analysis on the information and the parity bit; and means for associating the received information with at least one of the first logical data stream and the second logical data stream based on the parity error analysis.

16. A system according to claim 14, wherein the means for manipulating comprises:

means for generating incorrect parity for the information upon determining that the information is associated with the first logical data stream; and means for generating correct parity for the information upon determining that the information is associated with the second logical data stream.

17. An apparatus for transmitting information from a transmitting entity to a receiving entity, the apparatus comprising:

a parity generator that manipulates a parity bit associated with the information to be transmitted based on a determination whether the information is associated with at least one of a first logical data stream and a second logical data stream; and a transmitter that transmits the information and the manipulated parity bit from the transmitting entity to the receiving entity.

18. An apparatus for receiving information from a transmitting entity at a receiving entity, the apparatus comprising:

a parity circuit that performs a parity error analysis on received information and a manipulated parity bit; and a parser that associates the information with at least one of a first logical data stream and a second logical data stream based on the parity error analysis of the received information and the manipulated parity bit.

19. A method of communicating information from a transmitting entity to a receiving entity, the method comprising the steps of:

communicating information from the transmitting entity to the receiving entity, the information including a parity bit that is manipulated based on a determination whether the information is associated with one of a first logical data stream and a second logical data stream;

performing a parity error analysis on the communicated information using the manipulated parity bit; and parsing the communicated information according to a parsing process that is selected based on the parity error analysis using the manipulated parity bit to associate the information with one of the first logical data stream and the second logical data stream.

20. A method according to claim 19, wherein the step of parsing comprises the steps of:

selecting a parsing process from a plurality of predetermined parsing processes based on the parity error analysis; and parsing the information according to said selected parsing process.

21. A method according to claim 20, wherein the step of selecting a parsing process comprises the step of detecting the presence of a parity error associated with the communicated information; and wherein the step of parsing comprises the step of parsing the information according to the selected parsing process in response to detection of a parity error associated with the communicated information.

22. A method according to claim 21, wherein the parity bit is configured to produce the parity error at the receiving entity wherein the step of detecting is preceded by the step of configuring the transmitting entity and the receiving entity to operate with opposite parity.

23. A method according to claim 21, wherein the parity bit is configured to produce the parity error at the receiving entity wherein the step of detecting is preceded by the steps of:

configuring the transmitting entity and the receiving entity to operate with identical parity; and inverting the parity bit included in the information at the transmitting entity.

24. A method according to claim 20, wherein the step of selecting a parsing process comprises the step of detecting an absence of a parity error associated with the communicated information; and wherein the step of parsing comprises the step of parsing the communicated information according to the selected parsing process in response to the detection of the absence of a parity error associated with the information.

25. An apparatus for communicating data comprising:

a first parity generator that generates a first parity bit associated with information to be transmitted, wherein the first parity bit can be manipulated to provide a manipulated parity bit based on a determination of whether the information is associated with one of a first logical data stream and a second logical data stream;

a data transmitter, responsive to said first parity generator, configured to communicate the information including the manipulated parity bit in a communications medium;

a data receiver, responsive to the communications medium, configured to receive the communicated information including the manipulated parity bit;

a second parity generator, responsive to said data transmitter, that generates a second parity bit from the received information;

a comparator that compares the manipulated parity bit with the second parity bit; and a parser, responsive to the data receiver and the comparator, that parses the received information based on the comparison of the manipulated parity bit and the second parity bit to associate the information with one of the first logical data stream and the second logical data stream.

26. The apparatus of claim 25, wherein the first parity generator can be configured independently of the second parity generator.

27. The apparatus of claim 25, wherein the data transmitter comprises a universal asynchronous transmitter receiver.

28. The apparatus of claim 25, wherein the transmitter and the receiver comprise a EIA232/V.24 interface.

29. An apparatus for communicating information from a transmitting entity to a receiving entity, the apparatus comprising:

means for communicating information from the transmitting entity to the receiving entity, the information including a parity bit that is manipulated based on a determination whether the information is associated with one of a first logical data stream and a second logical data stream;

means for performing a parity error analysis on the communicated information using the manipulated parity bit; and means for parsing the communicated information according to a parsing process that is selected based on the parity error analysis using the manipulated parity bit to associate the communicated information with one of the first logical data stream and the second logical data stream.

30. An apparatus according to claim 29, wherein the means for parsing comprises:

means for selecting a parsing process from a plurality of predetermined parsing processes based on the parity error analysis; and means for parsing the information according to said selected parsing process.

31. An apparatus according to claim 30, wherein the means for selecting a parsing process comprises means for detecting the presence of a parity error associated with the communicated information; and wherein the means for parsing comprises the step of parsing the information according to the selected parsing process in response to detection of a parity error associated with the communicated information.

32. An apparatus according to claim 30, wherein the means for selecting a parsing process comprises means for of detecting an absence of a parity error associated with the communicated information; and wherein the means for parsing comprises means for parsing the communicated information according to the selected parsing process in response to the detection of the absence of a parity error associated with the information.

* * * * *

UNITED STATES PATENT AND TRADEMARK OFFICE
CERTIFICATE OF CORRECTION

PATENT NO. : 6,282,685 B1  Page 1 of 1
APPLICATION NO. : 08/974965
DATED : August 28, 2001
INVENTOR(S) : Petty et al.

It is certified that error appears in the above-identified patent and that said Letters Patent is hereby corrected as shown below:

Column 9, line 52, please change "enor" to -- error --.
Column 10, line 11, please change "conununicating" to -- communicating --.
Column 10, line 20, please change "paity" to -- parity --.
Column 10, line 22, please change "paring" to -- parsing --.

Signed and Sealed this

Twenty-first Day of November, 2006

JON W. DUDAS
*Director of the United States Patent and Trademark Office*